United States Patent [19]

Tsuyuguchi et al.

[11] Patent Number: 4,809,119

[45] Date of Patent: Feb. 28, 1989

[54] CIRCUIT ARRANGEMENT FOR THE DETERMINATION OF THE CONSTANT SPEED ROTATION OF A DISKLIKE RECORD MEDIUM

[75] Inventors: Hiroshi Tsuyuguchi, Tokyo; Katsuya Enami, Tachikawa, both of Japan

[73] Assignee: Teac Corporation, Tokyo, Japan

[21] Appl. No.: 929,402

[22] Filed: Nov. 10, 1986

[30] Foreign Application Priority Data

Nov. 14, 1985 [JP] Japan ................................ 60-255627

[51] Int. Cl.$^4$ ............................................. G11B 12/28
[52] U.S. Cl. ...................................................... 360/73
[58] Field of Search .......................................... 360/73

[56] References Cited

U.S. PATENT DOCUMENTS 4,089,029 5/1978 Castrodale et al. .................... 360/99
4,532,561 7/1985 Kimura .................................. 360/73

FOREIGN PATENT DOCUMENTS 0123848 3/1984 European Pat. Off. .
60-138775 7/1985 Japan .................................... 360/73

Primary Examiner—A. J. Heinz
Attorney, Agent, or Firm—Woodcock Washburn Kurtz Mackiewicz & Norris

[57] ABSTRACT

A circuit arrangement for a flexible magnetic disk drive having an index sensor for optically sensing an index hole defined eccentrically in the magnetic disk, with the index sensor putting out an electric index pulse of less than a predetermined duration each time it detects the index hole during the rotation of the magnetic disk. The index sensor is prone to put out invalid pulses of not less than the predetermined duration as a result of the displacement of the magnetic disk relative to the index sensor. For detecting the constant speed rotation of the magnetic disk on the basis of the valid index pulses only, the circuit arrangement comprises an index pulse spacing detector circuit for producing an index pulse spacing signal indicative of whether the spacings between the successive index sensor output pulses are less than a predetermined limit or not, a latching circuit for putting out a constant speed rotation signal in response to the index pulse spacing signal when the spacing between any two consecutive index sensor output pulses is less than the predetermined limit, and an index pulse duration detector circuit for inhibiting the production of the constant speed rotation signal by the latching circuit upon detection of an invalid pulse even if the spacing between this invalid pulse and the next index sensor output pulse is less than the predetermined limit.

9 Claims, 4 Drawing Sheets

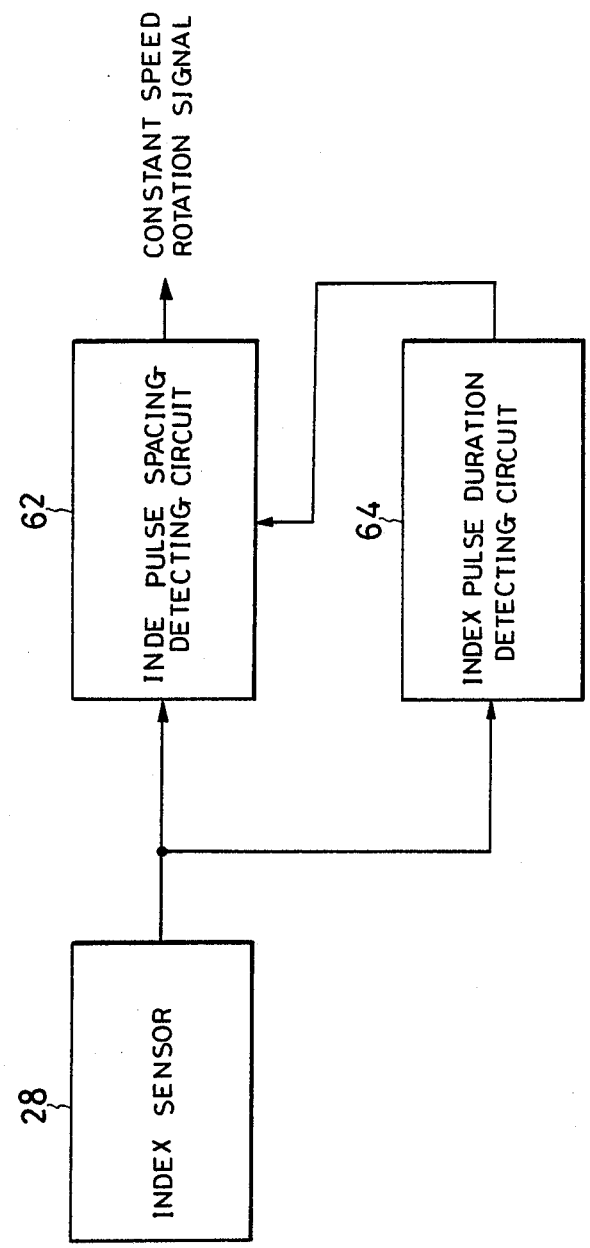

CIRCUIT ARRANGEMENT FOR THE DETERMINATION OF THE CONSTANT SPEED ROTATION OF A DISKLIKE RECORD MEDIUM

BACKGROUND OF THE INVENTION

Our invention relates generally to apparatus for data transfer with disklike record media typically including a flexible magnetic disk, and more particularly to such data transfer apparatus of the type having an index sensor for putting out a series of index pulses representative of the rotational speed of the record medium. Still more particularly, our invention pertains to an electric circuit arrangement, for use in such data transfer apparatus, for ascertaining from the index pulses whether or not the record medium is in constant speed rotation, in the face of invalid pulses that may be generated accidentally by the index sensor.

The flexible magnetic disk, housed in an apertured, protective envelope to make up a disk assembly or cartridge, has usually an index hole defined eccentrically therein, as disclosed for example in Castrodale et al. U.S. Pat. No. 4,089,029. The apparatus for data transfer with the magnetic disk, known also as a disk drive, has an index sensor for optionally sensing the index hole in the magnetic disk during the rotation of the latter. the index sensor puts out an electric index pulse each time it detects the index hole. Among the purposes for which the index pulses are used is the detection of whether or not the magnetic disk is in constant speed rotation and so is ready for the commencement of data transfer. The detection of the disk speed is possible from the repetition rate or spacings of the index pulses. Reference may be had to European Patent Publication No. 123,848, filed by the assignee of our instant application, for more details on this subject.

As heretofore constructed, the disk drive has had a problem in connection with the optical sensing of the index hole in the magnetic disk, possibly resulting in the erroneous or premature determination of the constant speed rotation of the disk.

Let us suppose that, when being loaded in the disk drive the magnetic disk is moved back and forth across the index sensor. Then the index sensor will produce a pulse or pulses just as it does when the index hole travels past the same during the rotation of the magnetic disk. The pulses put out by the index sensor during disk rotation are the valid index pulses whereas those generated as by the mishandling or accidental displacement of the magnetic disk are the invalid pulses that should be suppressed. Conventionally, however, the electronic circuitry of the disk drive has not been equipped to discriminate between the valid and the invalid pulses generated by the index sensor. Thus the conventional disk drive circuitry has been prone to erroneously or prematurely determine the constant speed rotation of the magnetic disk on the basis of the invalid output pulses of the index sensor.

It will be seen that the above described problem is not limited to the flexible magnetic disk drive alone. A similar problem can occur in other comparable devices such as those for use with optical record media.

SUMMARY OF THE INVENTION

We have hereby found out how to discriminate between the valid and invalid output pulses of the index sensor in data transfer apparatus of the type defined, how to suppress the invalid pulses and, eventually, how to accurately detect the constant speed rotation of the record media on the basis of the valid index pulses only.

Stated briefly, our invention provides, in an apparatus for data transfer with a disklike record medium such as a flexible magnetic disk which is rotated at a predetermined constant speed during data transfer, a system for detecting the rotation of the record medium substantially at the constant speed. The system of our invention comprises an index sensor disposed adjacent a predetermined path of an index hole or other mark rotatable with the record medium for generating a valid index pulse of less than a predetermined duration each time the index sensor senses the index during the rotation of the record medium, with the possibility, due for example to the mishandling of the record medium, of the index sensor generating invalid pulses of not less than the predetermined duration. Also included is a constant speed detector circuit connected to the index sensor for discriminating between the valid and invalid index sensor output pulses and for putting out a constant speed rotation signal, indicative of the rotation of the record medium substantially at the constant speed, only when at least two valid index pulses of less than the predetermined duration are supplied consecutively with less than a predetermined spacing therebetween.

Our invention is based upon the discovery that the invalid output pulses of the index sensor are invariably of much greater duration than the valid index pulses. Thus the constant speed detector circuit discriminates between the valid and invalid pulses depending upon whether their durations are less than a predetermined limit or not. The constant speed detector circuit is equipped to suppress all the index sensor output pulses whose durations are not less than the predetermined limit, putting out the constant speed rotation signal only when at least two valid index pulses are supplied consecutively with less than a prescribed spacing therebetween. We have thus succeeded in accurately ascertaining the moment the record medium begins to rotate at a practically constant speed, despite the invalid pulses that may be generated by the index sensor as when the record medium is accidentally displaced back and forth relative to the same.

The above and other features and advantages of our invention and the manner of realizing them will become more apparent, and the invention itself will best be understood, from a study of the following description and appended claims, with reference had to the attached drawings showing some preferable embodiments of our invention.

BRIEF DESCRIPTION OF THE DRAWINGS

FIG. 4 is a block diagram of an alternative form of the circuit arrangement of FIG. 1.

DESCRIPTION OF THE PREFERRED EMBODIMENTS

Figure 1:
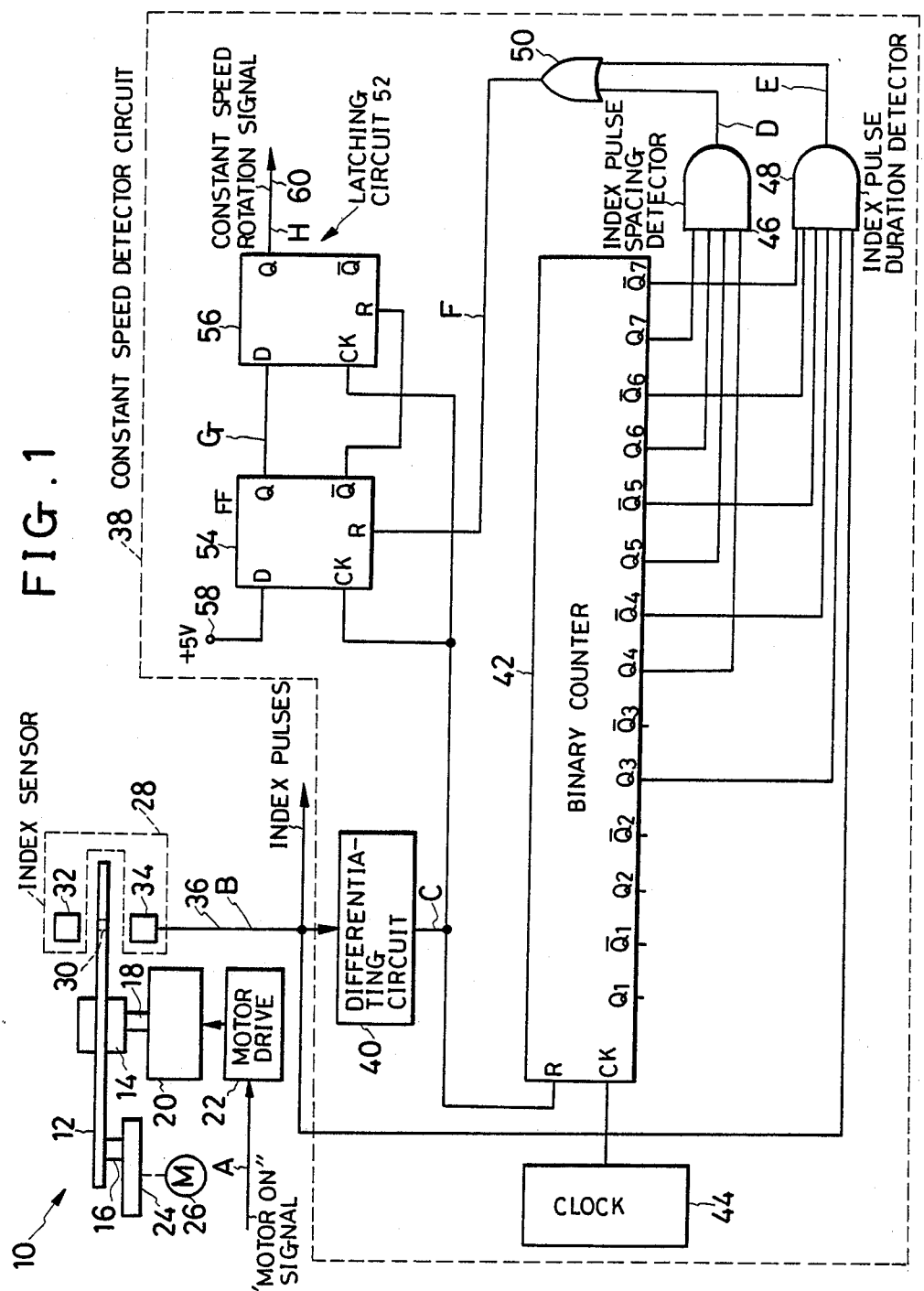
FIG. 1 is a block diagram of the circuit arrangement for a flexible magnetic disk apparatus embodying the principles of our invention, the circuit arrangement being shown together with some associated mechanical parts and components of the apparatus.

We will now describe our invention in details as adapted specifically for a disk drive for data transfer with a flexible magnetic disk under the control of host equiment. Generally designated 10 in FIG. 1, the disk drive has its mechanical configuration ilustrated therein only insofar as is necessary for a full understanding of our invention. The disk drive 10 is shown together with the flexible magnetic disk 12 clamped onto a turntable 14 for data transfer with a magnetic head assembly 16. The turntable 14 is rigidly and concentrically mounted on the top of a drive shaft 18 extending upwardly from a disk drive motor 20. This motor is electrically connected to a motor drive circuit 22. The host equipment, not shown, delivers a "motor on" signal to the motor drive circuit 22, causing the same to set the disk drive motor 20 into and out of rotation as required.

The magnetic head assembly 16 is suitably mounted on a carriage 24 thereby to be reciprocably transported radially of the magnetic disk 12 on the turntable 14 for accessing a series of concentric magnetic tracks on the disk. Employed for such linear, reciprocable travel of the carriage 24 is a head transport motor 26 of, preferably, the electric stepping type. A motion translating mechanism, not shown, of any known or suitable design such as a lead screw is interposed between the head transport motor 26 and the carriage 24 for translating the bidirectional, incremental rotation of the former into the linear, stepwise, reciprocating motion of the latter.

At 28 is shown an index sensor for optically sensing an index hole 30 defined eccentrically in the magnetic disk 12. The index sensor 28 comprises a light source 32 and a photodetector 34 disposed on the opposite sides of the magnetic disk 12, in such positions of registry that the index hole 30 travels between the light source and the photodetector with the rotation of the magnetic disk 12. The light source 32 irradiates the photodetector 34 each time the index hole 30 travels therebetween, resulting in the production of an electric index pulse for delivery over an output line 36 to a constant speed detector circuit 38. As the name implies, the constant speed detector circuit 38 determines from the incoming index pulses whether or not the magnetic disk 12 is in rotation at such a constant speed as to justify the commencement of data transfer.

We understand that the magnetic disk 12 has but one index hole 30 formed in a preassigned angular position thereon. Therefore, the index sensor 28 puts out one index pulse with each complete revolution of the magnetic disk 12. Commonly, in this type of disk drive, the magnetic disk 12 rotates at a rate of 300 revolutions per minute during the progress of data transfer with the head assembly 16. Thus the index sensor 28 normally puts out one index pulse every 0.2 second (sec) or 200 milliseconds (msec); in other words, the normal time spacings of the index pulses are 200 msec. These valid index pulses are utilized in a known manner for the detection of the rotational speed of the magnetic disk 12, as well as for the determination of its angular position.

Although the time spacings of the index pulses normal data transfer are 200 msec as aforesaid, the initiation of data transfer is possible when the index pulse time spacing grows less than 240 msec, or 120 percent of the normal spacing. With this in mind we have designed the constant speed detector circuit 38 so that it will produce a constant speed rotation signal, indicative of the disk rotation at substantially the constant speed, when the time spacings of the successively incoming index pulses grows less than 240 msec.

However, as we have stated in connection with the prior art, the index sensor 28 may produce not only the valid index pulses but also invalid pulses of greater duration. The constant speed detector circuit 38 incorporates means for detecting the durations of the index sensor output pulses, in addition to means for detecting their time spacings, in accordance with the novel concepts of our invention. The constant speed rotation signal is put out only when two valid index pulses, each having a duration of less than a prescribed limit, are supplied consecutively with a time spacing of less than 240 msec. We demarcate the durations of valid and invalid pulses by setting the boundary therebetween at 8 msec. Any index sensor output pulse is a valid index pulse if its duration is less than 8 msec, and is invalid if its duration is not less than this limit.

Designed in conformity with the above discussed principles of our invention, the constant speed detector circuit 38 has a differentiating circuit 40 coupled directly to the output line 36 of the index sensor 28. The differentiating circuit 40 can be of known construction capable of putting out a short duration pulse in response to the leading edge of each output pulse of the index sensor 28.

A binary counter 42 constitutes in combination with the differentiating ciricut 40 a counter circuit for counting clock pulses in response to the leading edge of each index sensor output pulse. The binary counter 42 has a reset input R coupled to the differentiating circuit 40 and a clock input CK coupled to a clock 44. therefore, reset by the leading edge of each index sensor output pulse, the binary counter 42 restarts the counting of the clock pulses from the clock 44. The clock pulses have a repetition rate of 500 Hz; that is, their time spacing are 2 msec. The binary counter 42 has a set of noninverting output terminals Q1 through Q7 and a set of inverting output terminals $\overline{Q1}$ through $\overline{Q7}$. Incremented on the binary basis by the clock pulses, the binary counter 42 provides the following counts through its output terminals Q1 through Q7 after having been reset each time: "1000000" in response to the first clock pulse; "0100000" in response to the second clock pulse; "1100000" in response to the third clock pulse; "0010000" in response to the fourth clock pulse, and so forth. Thus, in response to the 120th clock pulse, or upon lapse of 240 msec after having been reset, the output terminals Q1 through Q7 of the binary counter 42 provides the count of "0001111".

The inverting output terminals $\overline{Q1}$ through $\overline{Q7}$ of the binary counter 42 provides the invedrsions of the outputs from the noninverting terminals Q1 through Q7, respectively. For example, when the outputs from the noninverting terminals are "0010000" in response to the fourth clock pulse, the outputs from the inverting terminals are "1101111".

It will have been seen from the foregoing that the lapse of time from the leading edge of each index sensor output pulse is ascertainable from the outputs from the binary counter 42. The constant speed detector circuit 38 must be capable of determining: (1) whether the time spacings of the index sensor output pulses are less than 240 msec or not; and (2) whether the duration of each index sensor output pulse is 8 msec or not. We have employed in this embodiment a four inputs AND gate 46 as an index pulse spacing detector circuit and a six inputs AND gate 48 as an index pulse duration detector circuit. The AND gate 46 has its four intput ports coupled to the output terminals Q4, Q5, Q6 and Q7 of the binary counter 42. The other AND gate 48 has five of its six input ports coupled to the output terminals Q3, $\overline{Q4}$, $\overline{Q5}$, $\overline{Q6}$, and $\overline{Q7}$ of the binary counter 42. The remaining one input port of the AND gate 48 is coupled to the output line 36 of the index sensor 28. The output ports of both AND gates 46 and 48 are connected via an OR gate 50 to a latching circuit 52 to be detailed subsequently.

As is apparent from the foregoing discussion of the binary counter 42, the four inputs to the AND gate 46 of the index pulse spacing detector become all high (binary ONEs) upon lapse of 240 msec after the counter has been reset each time. The output from this AND gate 46 is supplied via the OR gate 50 to the latching circuit 52 as an index pulse spacing signal indicative of whether the successive index sensor output pulses have spacings of less than 240 msec or not, that is, whether the magnetic disk 12 is in rotation at substantially constant speed or not.

The five binary outputs delivered from the counter 42 to the AND gate 48 of the index pulse duration detector become all high upon lapse of 8 msec after the counter has been reset each time. The corresponding output from the AND gate 48 at that time depends upon the state of the output from the index sensor 28. The output from the AND gate 48 is also delivered via the OR gate 50 to the latching circuit 52 as an index pulse duration signal indicative of whether each index sensor output pulse has a duration of less than 8 msec or not, that is, whether it is a valid index pulse or not.

In response to the index pulse spacing signal and the index pulse duration signal, the latching circuit 52 puts out a constant speed rotation signal, indicative of the rotation of the magnetic disk 12 at substantially constant speed, by latching the index pulse spacing signal when the spacing between two consecutive valid index pulses is less than the predetermined limit of 240 msec. However, if at least one of the two consecutive index pulses is invalid, the index pulse duration signal from the AND gate 48 inhibits the latching of the index pulse spacing signal regardless of the spacing between the two pulses.

For the accomplishment of the foregoing purposes, the latching circuit 52 comprises first 54 and second 56 D flip flops. The first D flip flop 54 has a data input D coupled to a five volts positive supply terminal 58, a clock input CK coupled to the differentiating circuit 40, and a reset input R coupled to the OR gate 50. The second D flip flop 56 has a data input D coupled to the Q output of the first flip flop 54, a clock input CK coupled to the differentiating circuit 40, and a reset input R coupled to the Q output of the first flip flop 54. Connected to the Q output of the second flip flop 56 is an output line 60 for the delivery of the constant speed rotation signal.

Operation

Figure 2:
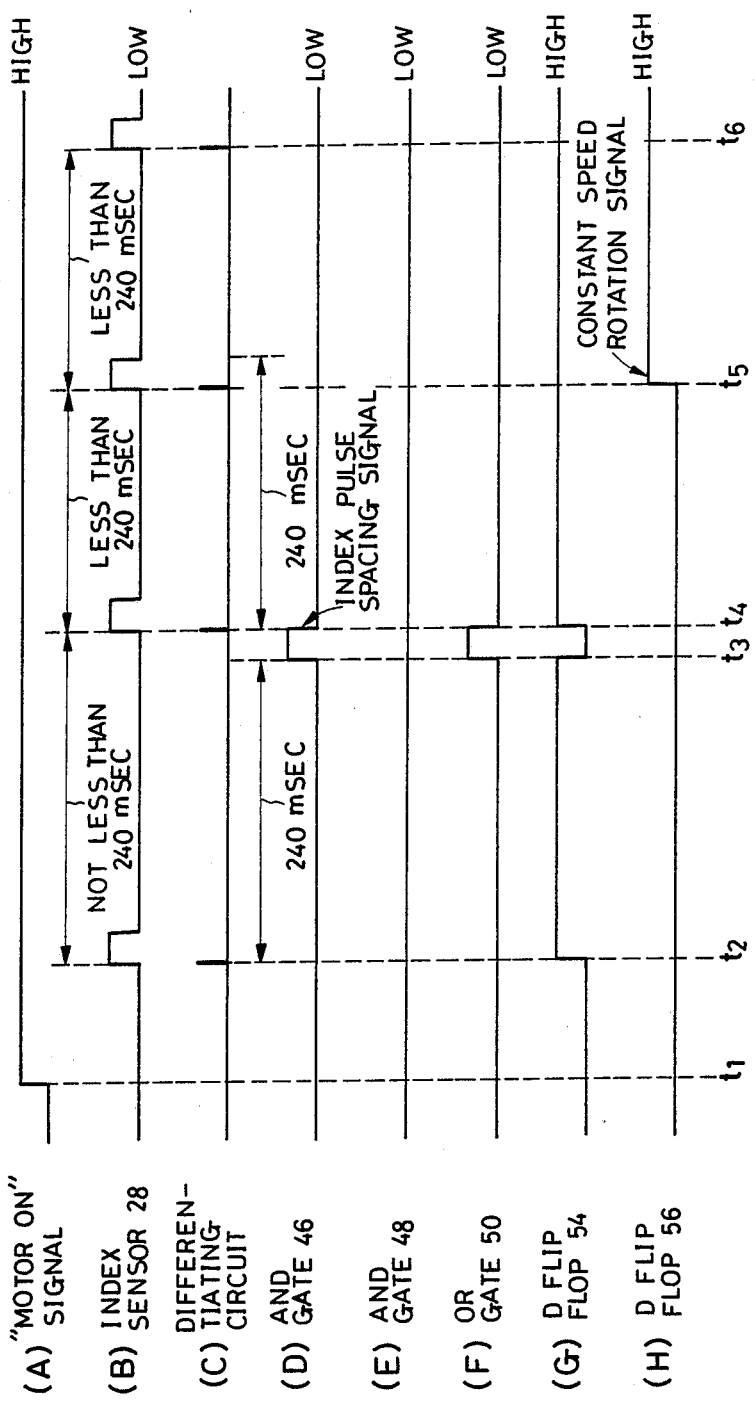
FIG. 2 is a diagram of some pertinent waveforms, shown in correct time relationship to one another, appearing in the various parts of the circuit arrangement of FIG. 1, the waveforms being shown on the assumption that no invalid pulse is generated by the index sensor.
Figure 3:
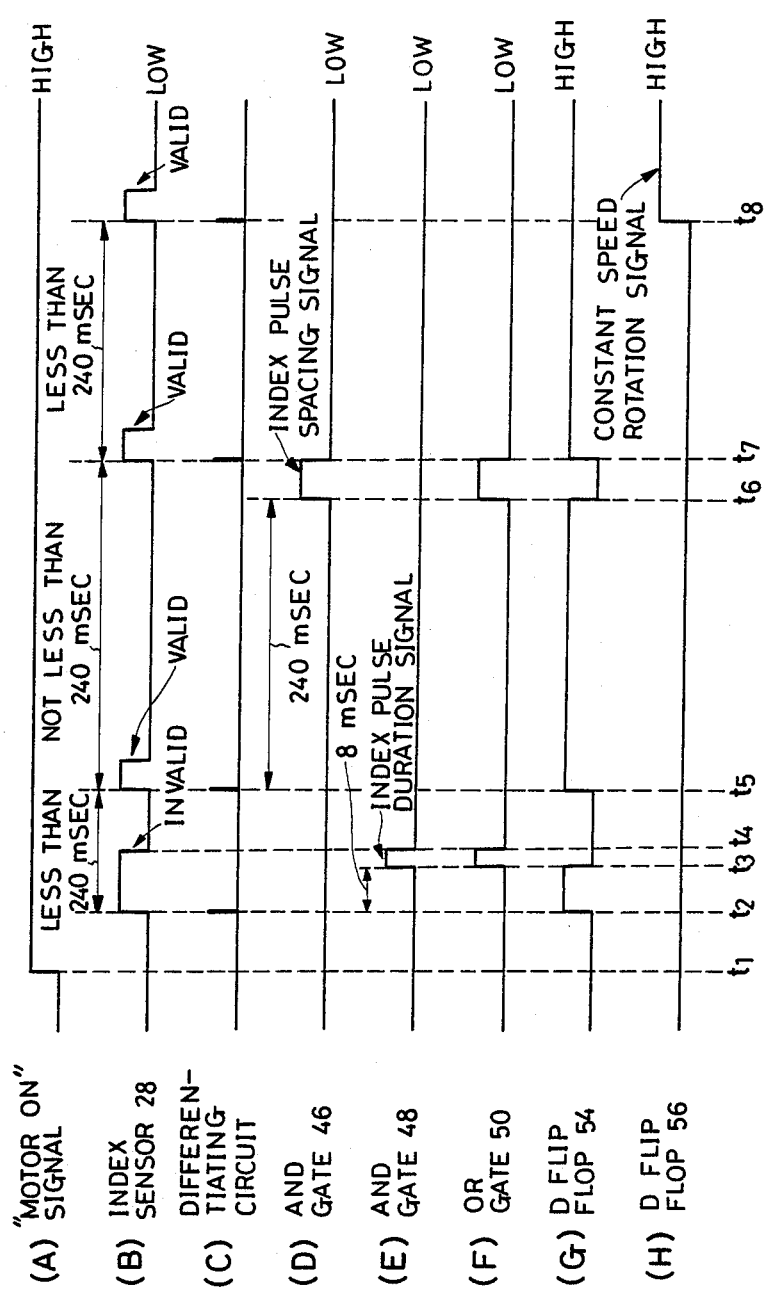
FIG. 3 is a waveform diagram similar to FIG. 2 except that it is explanatory of the operation of the circuit arrangement when an invalid pulse is generated by the index sensor prior to the production of a series of valid index pulses.

We will refer to the waveform diagrams of FIGS. 2 and 3 for the operational description of the FIG. 1 embodiment. FIG. 2 shows at (A) through (H) the waveforms appearing at the various parts of the FIG. 1 system when the index sensor 28 puts out valid index pulses only. FIG. 3 shows, also at (A) through (H), the waveforms appearing at the same parts of the FIG. 1 system when the index sensor 28 puts out an invalid pulse, followed by a succession of valid index pulses. We have indicated in FIG. 1 the parts where the waveforms (A) through (H) of FIGS. 2 and 3 appear, by the same capitals A through H for the easier understanding of the operation.

With reference first to FIG. 2, at (A) therein is shown the "motor on" signal from the host equipment to go high at a moment t1 following the loading of the magnetic disk 12 in the disk drive 10. In response to this "motor on" signal the motor drive circuit 22 will set the disk drive motor 20 into rotation with the magnetic disk 12. The index sensor 28 will start producing a series of index pulses, shown at (B) in FIG. 2 with the rotation of the magnetic disk 12.

We have assumed that all these index pulses are invalid, with durations of less than 8 msec. However, since it takes some time for the magnetic disk 12 to start rotation at the desired constant speed, the spacings of the valid index pulses will initially be not less than the prescribed limit of 240 msec.

As indicated at (C) in FIG. 2, the differentiating circuit 40 will put out a short duration pulse in synchronism with the leading edge of each index pulse, for delivery to the reset input R of the binary counter 42. Thus, reset at a moment t2, which is the start time of the first index pulse, the binary counter 42 starts counting the clock pulses which are delivered to its clock input CK from the clock 44 at a repetition rate of 500 Hz.

The differentiating circuit 40 also delivers its output pulses to the clock inputs CK of the two D flip flops 54 and 56 of the latching circuit 52, causing both flip flops to latch the data inputs at the moment of the clocking. Since the first flip flop 54 has its data input D coupled to the five volts supply terminal 58, the Q output of this first flip flop will go high at the moment t2, as at (G) in FIG. 2. The second flip flop 56 has its data input D coupled to the Q output of the first flip flop 54. However, the Q output of the first flip flop 54 will go high with some delay after the clocking; in other words, the Q output of the first flip flop 54 was low when the second flip flop 56 was clocked at the moment t2. Therefore, as shown at (H) in FIG. 2, the Q output of the second flip flop 56 will remain low despite the clocking at the moment t2. That is to say that the constant speed rotation signal is still low, indicating that the magnetic disk 12 is not yet in constant speed rotation.

The index sensor 28 will put out the second index pulse at a moment t4, as at (B) in FIG. 2, after one complete revolution of the magnetic disk 12. Let us assume that the spacing between the first and second index pulses, or the time from moment t2 to moment t4, is more than 240 msec. Then the prescribed time spacing of 240 msec will elapse some time before the appearance of the second index pulse, as at a moment t3 preceding the moment t4. The binary counter 42 will have just counted the 120th clock pulse upon lapse of 240 msec after having been reset by the differentiating circuit output pulse at the moment t2. The resulting outputs from its terminals Q4, Q5, Q6 and Q7 are all binary ONEs as aforesaid. Consequently, the index pulse spacing signal produced by the AND gate 46 will go high at the moment t3, as at (D) in FIG. 2, indicating that the time spacing between the first and second index pulses is not less than the predetermined limit of 240 msec.

The five signals delivered from the outputs Q3, $\overline{Q4}$, $\overline{Q5}$, $\overline{Q6}$ and $\overline{Q7}$ of the binary counter 42 to the AND gate 48 of the index pulse duration detector circuit will also be all high upon lapse of 8 msec after the moment t2. However, since we have assumed that the index pulses of FIG. 2 are all valid, the other one input delivered from the index sensor 28 to the AND gate 48 will have gone low before the lapse of 8 msec after the moment t2. Accordingly, the index pulse duration signal from the AND gate 48 will remain low, as at (E) in FIG. 2, indicating the validity of the first output pulse of the index sensor 28. It will also be noted from FIG. 2(E) that the index pulse duration signal remains low as long as the index sensor 28 continues the production of valid index pulses.

Going high at the moment t3 as above stated in connection with FIG. 2(D), the index pulse spacing signal is impressed via the OR gate 50 to the reset input R of the first flip flop 54 of the latching circuit 52. So reset, the Q output of this first flip flop will go low at the moment t3, as is apparent from (D), (F) and (G) in FIG. 2.

Upon appearance of the second valid index pulse at the moment t4, the binary counter 42 will be reset at the same moment and will restart the counting of the clock pulses. Also, at the same moment, flip flops 54 and 56 of the latching circuit 52 will be clocked again. Thereupon the Q output of the first flip flop 54 will go high, as at (G) in FIG. 2, whereas the Q output (constant speed rotation signal) of the second flip flop 56 will remain low, as at (H) in FIG. 2, since the second flip flop latches the low output from the first flip flop 54 before the latter is clocked at the moment t4.

At (B) in FIG. 2 we have shown the third valid index pulse appearing at a moment t5, which is spaced from the moment t4 less than the prescribed time spacing of 240 msec. This means that the rotative speed of the magnetic disk 12 has become sufficiently high for the commencement of data transfer.

As will be seen from (D) in FIG. 2, the index pulse spacing signal from the AND gate 46 has been low from moment t4 to moment t5 because the third valid index pulse has appeared before the lapse of 240 msec following the moment t4. Consequently, the Q output from the first flip flop 54 of the latching circuit 52 has been high from moment t4 to moment t5 as at (G) in FIG. 2. Clocked at the moment t5 by the output from the differentiating circuit 40, the first flip flop 54 will hold its Q output high. This Q output of the first flip flop 54 has been high since the moment t4, so that the second flip flop 56 will latch the high output from the first flip flop. The resulting high output from the second flip flop 56 will be delivered over the output line 60 to a "ready" detector circuit, not shown, as the constant speed rotation signal representing the constant speed rotation of the magnetic disk 12.

As is standard with data processing systems comprising two or more disk drives, each constructed as in FIG. 1, under the control of a host computer, the delivery of the constant speed rotation signal to the unshown "ready" detector circuit does not by itself warrant the commencement of data transfer. Instead, the "ready" detector circuit determines that this disk drive is ready when not only the constant speed rotation signal but also the "drive select" and "motor on" signals are also high.

We have so far explained the operation of the FIG. 1 system on the assumption that the index sensor 28 puts out valid index pulses only. While loading the magnetic disk 12, or the magnetic disk cartridge including the disk 12, in the disk drive 10, the operator may accidentally move the disk back and forth with respect to the index sensor 28. Thereupon the index sensor may generate false pulses that should be invalidated. Being generated by artificial disk displacement, such invalid output pulses of the index sensor are generally of much longer durations than those of the valid index pulses. The durations of the valid index pulses usually range from 2.0 to 5.5 msec when the magnetic disk is in rotation at a constant speed of 300 rpm. We have found from experiment that for the optimum performance of the FIG. 1 system, any index sensor output pulse should be invalidated if its duration is not less than 8 msec.

Now, referring to FIG. 3, we have shown at (B) therein that the index sensor puts out an invalid pulse, with a duration of not less than 8 msec, from moment t2 to moment t4, following a moment t1 when the "motor on" signal goes high as at (A). In response to this invalid pulse the differentiating circuit 40 will produce a short duration pulse at the moment t2 thereby resetting the binary counter 42, whereupon the latter will start counting the clock pulses being supplied from the clock 44.

As four clock pulses are supplied at 2 msec spacings to the binary counter 42 from moment t2 to moment t3, that is, upon lapse of 8 msec from the moment t2, the outputs from the terminals Q1 through Q7 of the binary counter will be "0010000". Therefore, the outputs from the terminals Q3, $\overline{Q4}$, $\overline{Q5}$, $\overline{Q6}$, and $\overline{Q7}$ of the binary counter 42, which are all connected to the AND gate 48 of the index pulse duration detector circuit, will all be binary ONEs. The invalid pulse being put out by the index sensor 28 is also high upon lapse of 8 msec from the moment t2. Thus, since all the inputs to the AND gate 48 are high, the output (index pulse duration signal) from this AND gate will go high, as at (E) in FIG. 3. The index pulse duration signal, indicative of the fact that the pulse now being produced by the index sensor 28 is invalid, is delivered through the OR gate 50, as at (F) in FIG. 3, to the reset input R of the first flip flop 54 of the latching circuit 52. The flip flop 54 will thus be reset at the moment t3, with its Q output going low as at (G) in FIG. 3.

The invalid output pulse of the index sensor 28 is shown to disappear at the moment t4, some time after the lapse of 8 msec following the moment t2 of its leading edge. The outputs from the AND gate 48 and OR gate 50 will also go low as at (E) and (F) in FIG. 3.

The second output pulse of the index sensor 28, appearing at a moment t5 as at (B) in FIG. 3, is shown to be a valid index pulse, having a duration of less than 8 msec. The time spacing between the invalid pulse and this first valid index pulse is shown to be less than 240 msec. However, the time spacing between the first and second valid index pulse, the latter appearing at a moment t7, is shown to be not less than 240 msec. Therefore, despite the sufficiently short spacing between the first two output pulses of the index sensor 28, the magnetic disk 12 is not yet in constant speed rotation. We will explain hereafter how the constant speed detector circuit 38 operates to hold low the level of the constant speed rotation signal on its output line 60 until a moment t8 when the third valid index pulse appears with a time spacing of less than 240 msec from the second valid index pulse.

The binary counter 42 will recommence the counting of the clock pulses in response to the output pulse of the differentiating circuit 40 at the moment t5. Also, clocked by the same differentiating circuit output pulse at the moment t5, the first flip flop 54 will latch the supply voltage, so that its Q output will go high, as at (G) in FIG. 3. The Q output of the second flip flop 56, although also clocked at the same moment t5, will remain low, as at (H) in FIG. 3, since the Q output of the first flip flop 54 has been low from moment t3 to moment t5.

Were it not for the index pulse duration detector circuit, herein shown as the AND gate 48, taught by our invention, the Q output of the first flip flop 54 would have remained high even after the duration of the first index sensor output pulse reached the predetermined limit of 8 msec at the moment t3. Consequently, upon appearance of the second index sensor output pulse at the moment t5 with a time spacing of less than 240 msec from the first index sensor output pulse, the Q output of the second flip flop 56 would have gone high, resulting in the production of the constant speed rotation signal over the output line 60 when, actually, the magnetic disk 12 was not yet ready for data transfer.

No such premature production of the constant speed rotation signal takes place according to our invention. The AND gate 48 is effective to suppress, so to say, the invalid pulse of the moments t2-t4, enabling the constant speed detector circuit 38 to put out the constant speed rotation signal only in response to the valid index pulses incoming after the moment t5.

Since the time spacing between the first and second valid index pulses, appearing respectively at the moments t5 and t7, is not less than 240 msec as aforesaid, the AND gate 46 will go high at a moment t6, preceding the moment t7, upon lapse of 240 msec from the leading edge moment t5 of the first index pulse, as at (D) in FIG. 3. The resulting high output from the OR gate 50, shown at (F) in FIG. 3, will reset the first flip flop 54 of the latching circuit 52 thereby causing its Q output to go low as at (G) in FIG. 3. Then, clocked by the differentiating circuit output pulse in response to the leading edge of the second valid index pulse at the moment t7, the first flip flop 54 will have its Q output made high again. Although the second flip flop 56 is also clocked at the same moment, its Q output will remain low, as at (H) in FIG. 3, since the Q output of the first flip flop 54 has been low at the exact moment of the clocking.

The third valid index pulse is shown to appear at the moment t8 with a time spacing of less than 240 msec from the second valid index pulse. The AND gate 46 has been low since the moment t7, so that the Q output of the first flip flop 54 of the latching circuit 52 has also been high since that moment. Upon clocking of this first flip flop 54 at the moment t8, its Q output will remain high. The second flip flop 56 is also clocked at the same moment t8. This time, however, the Q output of the first flip flop 54 has been high since the moment t7, so that the Q output of the second flip flop 56 will go high as at (H) in FIG. 3, resulting in the production of the constant speed rotation signal over the output line 60.

As may have been noted, the constant speed detector circuit 38 operates in the same way from moment t6 to moment t8 of FIG. 3 and from moment t3 to moment t5 of FIG. 2.

Alternative Form

We have illustrated in FIG. 4 an alternative circuit configuration that may be employed in substitution for that of FIG. 1. In this alternative configuration the constant speed detector circuit 38 of the FIG. 1 embodiment is divided into an index pulse spacing detecting circuit 62 and an index pulse duration detecting circuit 64. Both circuits 62 and 64 are connected to the index sensor 28.

The index pulse spacing detecting circuit 62 is devoted to the determination of whether the time spacings of the successive output pulses of the index sensor 28 are less than a prescribed limit (e.g. 240 msec) or not. If the time spacing between at least two consecutive index sensor output pulses is less than the limit, this circuit 62 is conditioned to put out the constant speed rotation signal.

The index pulse duration detecting circuit 64, on the other hand, is solely for the determination of the validity of each index sensor output pulse, detecting whether its duration is less than a prescribed limit (e.g. 8 msec) or not. The output of the duration detecting circuit 64 is coupled to the spacing detecting circuit 62. Upon detection of any invalid pulse the duration detecting circuit 64 may deliver an appropriate signal to the spacing detecting circuit 62, preventing the same to put out the constant speed rotation signal even if the time spacing between the invalid pulse and the next index sensor output pulse, which may be valid or invalid, is less than the preassigned limit.

We believe that the constructions of these circuits 62 and 64 are self evident from the detailed construction of the constant speed detector circuit 38 shown in FIG. 1.

Possible Modifications

Although we have shown and described our invention in very specific aspects aspects thereof, we recognize, of course, that the various modifications of the above disclosed embodiments are possible within the broad teaching hereof to conform to specific system requirements or design preferences. The following, then, is a brief list of such possible modifications:

1. Instead of providing but one counter 42, which is shared by both AND gates 46 and 48 in the FIG. 1 embodiment, there may be employed two separate counters, one for the measurement of index pulse spacings and the other for the measurement of index pulse durations, as taught by the alternative embodiment of FIG. 4.

2. The record medium may be determined to be ready for the commencement of data transfer when the time spacings of the valid index pulses grow less than predetermined values other than 240 msec, such values being dependent upon variables such as the normal rotative speed of the record medium.

3. The output pulses of the index sensor may be determined to be invalid when their durations reach predetermined limits other than 8 msec, such limits being also dependent upon variables such as the size of the index mark on the record medium. We do, however, recommend the 8 msec limit for disk drives of the class disclosed herein.

4. RS flip flops may be employed in lieu of the D flip flops 54 and 56 of the FIG. 1 embodiment.

5. Instead of but one index hole 30 formed in the magnetic disk 12 of the FIG. 1 embodiment, two or more such openings may be formed in preassigned angular positions on a record medium for use with the apparatus constructed in accordance with out invention. It will be easy for the specialists to adapt the constant speed detector circuit 38 of the FIG. 1 embodiment for detecting the contant speed rotation of such a record medium.

6. Instead of forming one or more index holes in the magnetic disk or any other record media, a suitable index may be formed on the turntable, the rotary part of the drive motor, or any other rotary part that rotates with the record medium. Such an index may be, for example, of a permanent magnet or a light reflector, to be sensed magnetically or optically by an index sensor disposed in a fixed position adjacent the path of the index.

We claim:

1. In an apparatus for data transfer with a disklike record medium such as a flexible magnetic disk which is rotated at a predetermined constant speed during data transfer, a system for detecting the rotation of the record medium substantially at the constant speed, comprising:
   (a) an index sensor disposed adjacent a predetermined path of an index mark rotatable with the record medium for generating a valid index pulse of less than a predetermined duration each time the index sensor senses the index mark during the rotation of the record medium, so that the time spacing of the valid index pulses represents the speed of rotation of the record medium, there being the possibility, due for example to the mishandling of the record medium, of the index sensor generating invalid index pulses of not less than the predetermined duration; and
   (b) a constant speed detector circuit connected to the index sensor for discriminating between the valid and invalid output pulses of the index sensor and for putting out a constant speed signal when at least two valid index pulses are supplied consecutively with less than a predetermined time spacing representative of the roation of the record medium substantially at the constant speed.

2. In an apparatus for data transfer with a disklike record medium such as a flexible magnetic disk which has an index hole defined eccentrically therein and which is rotated at a predetermined constant speed during data transfer, a system for detecting the rotation of the record medium substantially at the constant speed, comprising:
   (a) an index sensor comprising a light source and a photodetector fixedly mounted on the opposite sides of the record medium for photoelectrically sensing the index hole in the record medium, the index sensor generating a valid index pulse of less than a predetermined duration each time the index sensor senses the index hole during the rotation of the record medium, so that the time spacing of the valid index pulses represents the speed of rotation of the record medium, there being the possibility of the index sensor generating invalid index pulses of not less than the predetermined duration as when the record medium is displaced relative to the index sensor at the time of loading of the record medium in the apparatus; and
   (b) a constant speed detector circuit connected to the index sensor for discriminating between the valid and invalid output pulses of the index sensor and for putting out a constant speed signal when at least two valid index pulses are supplied consecutively with less than a predetermined time spacing representative of the rotation of the record medium substantially at the constant speed.

3. In an apparatus for data transfer with a disklike record medium such as a flexible magnetic disk which is rotated at a predetermined constant speed during data transfer, a system for detecting the rotation of the record medium substantialy at the constant speed, comprising:
   (a) an index sensor disposed adjacent a predetermined path of an index rotatable with the record medium for generating a valid index pulse of less than a predetermined duration each time the index sensor senses the index during the rotation of the record medium, so that the time spacing of the valid index pulses represents the speed of rotation of the record medium, there being the possibility, due for example to the mishandling of the record medium, of the index sensor generating invalid index pulses of not less than the predetermined duration;
   (b) an index pulse spacing detecting circuit coupled to the index sensor for putting out a constant speed signal when at least two valid index pulses are supplied consecutively with less than a predetermined time spacing representative of the rotation of the record medium substantially at the constant speed; and
   (c) an index pulse duration detecting circuit having an input coupled to the index sensor and an output coupled to the index pulse spacing detecting circuit for preventing the latter from putting out the constant speed signal when at least one of two consecutive output pulses of the index sensor has a duration of not less than the predetermined limit even though the time spacing therebetween may be less than the predetermined time spacing.

4. In an apparatus for data transfer with a disklike record medium such as a flexible magnetic disk, wherein an index sensor is disposed adjacent a predetermined path of an index rotatable with the record medium for generating a valid index pulse with a duration of less than a predetermined limit, each time the index sensor senses the index during the rotation of the record medium, so that the time spacing of the valid index pulses represents the speed of rotation of the record medium, there being the possibility, due for example to the mishandling of the record medium, of the index sensor generating invalid pulses having durations of not less than the first predetermined limit, a circuit arrangement for detecting the constant speed rotation of the record medium from the time spacing of the valid index pulses in the face of the invalid output pulses of the index sensor, comprising:
   (a) a source of clock pulses;
   (b) a counter circuit responsive to the leading edge of each valid or invalid outpout pulse of the index sensor for restarting the counting of the clock pulses;
   (c) an index pulse spacing detector circuit responsive to the successive counts of the counter circuit for producing an index pulse spacing signal indicative of whether or not the time spacings between the successive valid or invalid output pulses of the index sensor are less than a second predetermined limit which represents the rotation of the record medium substantially at the constant speed;

(d) a latching circuit responsive to the index pulse spacing signal for putting out a constant speed rotation signal by latching the index pulse spacing signal when the time spacing between at least two consecutive output pulses of the index sensor is less than the second predetermined limit, the constant speed rotation signal being indicative of the rotation of the record medium substantially at the constant speed; and (e) an index pulse duration detector circuit responsive to the successive counts of the counter circuit for delivering to the latching circuit an index pulse duration signal indicative of whether each output pulse of the index sensor has a duration of less than the first predetermined limit or not, the index pulse duration signal being effective to inhibit the latching action of the latching circuit, and hence the production of the constant speed signal thereby, when any one output pulse of the index sensor has a duration of not less than the first predetermined limit even if the time spacing between this invalid pulse and the next output pulse of the index sensor is less than the second predetermined limit;

(f) whereby the latching circuit is permitted to produce the constant speed rotation signal only when at least two valid index pulses are generated consecutively by the index sensor with a time spacing less than the second predetermined limit.

5. The circuit arrangement of claim 4 wherein the counter circuit comprises:

(a) a differentiating circuit coupled to the index sensor; and (b) a binary counter having a clock input coupled to the clock pulse source and a reset input coupled to the differentiating circuit.

6. The circuit arrangement of claim 5 wherein the binary counter has a plurality of output terminals for providing outputs indicative of the counts of the clock pulses, and wherein the index pulse spacing detector circuit comprises a gate having input ports coupled to selected ones of the output terminals of the binary counter.

7. The circuit arrangement of claim 6 wherein the index pulse duration detector circuit comprises a second gate having input ports coupled to selected ones of the output terminals of the binary counter, the second gate having an additional input port coupled to the index sensor.

8. The circuit arrangement of claim 7 wherein the latching circuit comprises:

(a) a positive power supply;
(b) a first D flip flop having a data input coupled to the positive power supply, a clock input coupled to the differentiating circuit, and a reset input coupled to the first recited and second gates; and
(c) a second D flip flop having a data input coupled to a noninverting output of the first flip flop, a clock input coupled to the differentiating circuit, and a reset input coupled to an inverting output of the first flip flop, the second flip flop putting out the constant speed rotation signal.

9. The circuit arrangement of claim 4 wherein the first predetermined limit is approximately eight milliseconds.

* * * * *